United States Patent Office 3,294,759
Patented Dec. 27, 1966

3,294,759
LINEAR COPOLYAMIDES RESISTANT TO
BOILING WATER
Rudolf Gabler, Zollikerberg, Zurich, Switzerland, assignor to W. R. Grace & Co., Cambridge, Mass., a corporation of Connecticut
No Drawing. Filed Aug. 26, 1963, Ser. No. 304,689
2 Claims. (Cl. 260—78)

This invention relates to linear copolyamides which are resistant to boiling water and which can be used as molding, coating, or adhesive compositions as well as to a process of preparing them. In one particular aspect this invention relates to copolyamides formed from 3-aminomethyl-3,5,5-trimethyl-cyclohexylamine and an acid mixture comprised of adipic acid and an aromatic dicarboxylic acid.

Adipic acid and terephthalic acid have long been known as polyamide-forming components. For example, adipic acid condenses with hexamethylene diamine to form the technically valuable polyamide nylon 6/6 which is a crystalline, heat-resistant polymer capable of being spun to fibres from the melt. The polyamides derived thus far from terephthalic acid are also crystalline and fibre-forming, but in general, they have such high melting points that they can be spun or shaped only from their solution as disclosed in United States Patent No. 2,989,495, or by addition of plasticizers as described in United States Patent No. 2,752,328.

Cycloaliphatic diamines have also been used to prepare polyamides. As disclosed in United States Patent No. 2,916,476, a high-melting, crystalline fibre-forming copolyamide is obtained from a mixture of amines comprised of 1,4-cyclohexanebis (methylamine), and xylene-α,α′-diamine and a saturated aliphatic dicarboxy compound.

Little attention has been given thus far to cycloaliphatic diamines substituted in the 1,3-position since the polyamides composed thereof are not crystalline and therefore poor fibre-formers. In addition, they have relatively low melting points and a high swelling capacity in water. This applies also to the polyamide formed from 3-aminomethyl-3,5,5-trimethylcyclohexylamine and adipic acid which softens when immersed in water at a temperature below 100° C.

According to the instant invention, valuable polyamides are obtained by co-condensation of 3-amino-methyl-3,5,5-trimethyl-cyclohexylamine, and an acid mixture comprised of adipic acid and an aromatic dicarboxylic acid selected from the group consisting of terephthalic acid, isophthalic acid, and mixtures thereof. Preferably, the amount of the acid mixture used is equivalent to the amount of diamine employed. These polyamides have melting points between 210 and 270° C. They are stable in boiling water and are capable of being worked up from the melt without decomposition.

Briefly stated, the present invention is comprised of a process of preparing linear copolyamides which comprises condensing 3 - aminomethyl - 3,5,5 - trimethylcyclohexylamine with a substantially equimolar proportion of an acid mixture comprised of adipic acid and an aromatic dicarboxylic acid selected from the group consisting of terephthalic acid, isophthalic acid, and mixtures thereof.

Preferably, the acid mixture is comprised of 20 to 80 mol percent of adipic acid and 80 to 20 mol percent of the aromatic dicarboxylic acid. An acid mixture of such a preferred composition produces according to the instant invention a copolyamide with a softening range of 210 to 270° C. For example, an acid mixture comprised of 80 mol percent of adipic acid and 20 mol percent of terephthalic acid forms with 3-aminomethyl-3,5,5-trimethyl-cyclohexylamine a copolyamide which can be immersed in boiling water for several hours without being deformed. The working temperature of this copolyamide is 240 to 250° C. At this temperature the melt can be kept for hours without showing the slightest signs of decomposition. In contrast, a polyamide prepared in the same manner except that adipic acid only is used, softens when immersed in boiling water under the same conditions and can be kneaded like a paste.

A copolyamide having an excellent stability when immersed in boiling water for several weeks is produced according to the instant invention when the acid mixture contains a higher proportion of terephthalic acid, i.e. about 50 mol percent. Although these polyamides have working temperatures of between 270 and 290° C., they do not exhibit any decomposition on injection-molding, compression-molding and casting on commercial machines. However, when the acid mixture contains about 80 mol percent of the aromatic dicarboxylic acid the resulting copolyamide has a working temperature of 300-320° C. At such high working temperatures the shaping of the copolyamide may be restricted to those machines in which the melt is exposed only for a short time to higher temperatures as, e.g., in extruders or extrusion molding machines.

In preparing the linear copolyamides of the present invention, it is more advantageous to first prepare the salt of the components. This can be accomplished by forming a solution of the 3-aminomethyl-3,5,5-trimethylcyclohexylamine and preferably an equivalent amount of the acid mixture in water. The resulting aqueous salt solution may be used directly for the polycondensation process. If desired, the salt may be crystallized out of solution by the addition of alcohol, methanol, isopropanol, acetone or any suitable precipitant. This salt may then be purified by several recrystallizations. It is generally preferable to form the salt of the amine and adipic acid separately from the salt of the amine and the aromatic dicarboxylic acid. The salts can then be mixed in the desired proportions prior to polycondensation.

Polycondensation of the salt can be effected in a number of ways. For example, the salt may be dissolved in water at an elevated temperature in a stainless steel vessel which is equipped with a heating element and stirring means and connected to an autoclave. The resulting solution is transferred by nitrogen pressure into the autoclave which has been preheated to a temperature of about 200° C. The solution is then heated in the autoclave. After a few hours the water vapor is released, and the pressure equalized with atmospheric pressure. The temperature is raised and heating is continued at atmospheric pressure under a continuous stream of nitrogen for several hours. The polycondensation is carried out until copolyamides with a high molecular weight, i.e. preferably greater than 20,000, are obtained. Such high molecular weight copolyamides have an intrinsic viscosity greater than 1.

To produce a copolyamide of a specified molecular weight, monofunctional chain terminators such as acetic acid or stearic acid may be added to the reaction mass. This may also be accomplished by using an excess amount of one of the copolyamide-forming components.

The copolyamides of the present invention can also be prepared at lower temperatures using the boundary surface or interfacial condensation method, United States Patent No. 2,831,834), which consists in mixing, with thorough stirring, equivalent or nearly equivalent quantities of the acid halide, dissolved in a water immiscible solvent such as carbon tetrachloride, and an aqueous solution of the amine.

The copolyamides of the present invention may be produced as colorless, glass clear granules or as white powder depending upon the particular process of polycondensation used. The instant copolyamides may be molded to form a number of shaped articles such as ribbons, pipes, plates, foils and tubes. These articles are highly stable in the presence of boiling water.

Unless otherwise stated, all parts herein are parts by weight.

This invention is further illustrated by the following examples:

Example I

In a pressure vessel equipped with a mechanical stirrer, 117.5 parts of adipic acid and 33.2 parts of terephthalic acid were mixed with 120 parts of water. The air was then displaced with nitrogen and 170 parts of 3-aminomethyl-3,5,5-trimethylcyclohexylamine were added. The mixture was heated to 140–160° C. and stirred until a solution was obtained which was about 20 minutes.

By means of nitrogen pressure, the resulting salt solution was passed through a filter into an autoclave which had been preheated to 200° C. The temperature was then raised to 240° C. At the end of 2 hours, the water vapor was released and pressure equalization with atmospheric pressure was obtained.

The temperature was then gradually increased to 260° C. and the melt was heated at atmospheric pressure at a temperature in the range of 255–260° C. over a period of 16 hours.

The resulting melt was extruded into cold water by means of nitrogen pressure so as to form rods of the copolyamide. The rods were water clear. The copolyamide had a melting point of 210° C. and an intrinsic viscosity of 0.76 (measured in concentrated sulfuric acid at 20° C.).

The rods were mechanically granulated and injection-molded to form test pieces which were used in a series of tests to determine the physical and mechanical properties of this copolyamide which, for convenience, is designated Copolyamide A. The tests were conducted according to the "Deutsche Industrie Norm" and the results are shown in Table I.

As noted in Table I, the acid mixture used to form Copolyamide A was comprised of 80 mol percent adipic acid and 20 mol percent terephthalic acid. Copolyamides B and C, shown in Table I, were prepared and tested in the same manner as Copolyamide A except that the acid mixture used to form Copolyamide B was comprised of 50 mol percent adipic acid and 50 mol percent terephthalic acid and the acid mixture used to form Copolyamide C was comprised of 20 mol percent adipic acid and 80 mol percent terephthalic aicd.

Example II

In a pressure vessel equipped with a mechanical stirrer, 73 parts of adipic acid and 83 parts of terephthalic acid were mixed with 100 parts of water. The air was then displaced with nitrogen and 170 parts of 3-aminomethyl-3,5,5-trimethycyclohexylamine were added. The mixture was heated to 70–80° C. and stirred until a solution was obtained which was about 40–60 minutes.

The resulting hot salt solution was filtered into 3 liters of alcohol having a temperature of 60° C. and allowed, with stirring, to cool slowly, whereupon the salt mixture separated out in crystalline form. The mixture was cooled to −10° C. for 3 hours. The salt mixture was then filtered off. The yield was 85–95% of the theoretical value.

The salt mixture was dried and then dissolved in an equivalent amount of water in a stainless steel pressure vessel with stirring at 170–180° C. By means of nitrogen pressure the salt solution was passed into an autoclave which had been preheated to 200° C. The temperature was then raised to 240° C. At the end of 4 hours under autogenic pressure at 240° C., the water vapor was released and pressure equalization with atmospheric pressure was obtained.

The melt was then heated at atmospheric pressure at a temperature of 280° C. At the end of 6 hours at 280° C., the condensation was completed.

The viscous melt was extruded into cold water by means of nitrogen pressure so as to form rods which were then passed to a granulator. The resulting granulate was glass clear. The copolyamide had an intrinsic viscosity (measured in concentrated sulfuric acid at 20° C.) of 1.1 and began to soften at 230° C.

The granules were injection molded to form test rods. These test rods were immersed in boiling water for two weeks. At the end of this period, they showed no visible change.

Example III

The salts of 3-aminomethyl-3,5,5-trimethylcyclohexylamine and adipic acid, terephthalic acid and isophthalic acid, were prepared separately in the following manner:

*Salt of adipic acid.*—170 parts of the diamine were dissolved in 100 parts of ethyl alcohol. This solution was mixed with a solution of 146 parts of adipic acid in 200 parts of alcohol, whereupon the crystalline salt started to precipitate immediately. The salt was obtained in a yield of 92–94% of the theoretical value. It melted at 198–200° C.

TABLE I

| Properties | Copolyamides from 3-aminomethyl-3,5,5-trimethylcyclohexylamine and an acid mixture of adipic acid and terephthalic acid. | | |
|---|---|---|---|
| | Copolyamide A | Copolyamide B | Copolyamide C |
| | 80 mol percent adipic acid/20 mol percent terephthalic aicd | 50 mol percent adipic acid/50 mol percent terephthalic acid | 20 mol percent adipic acid/80 mol percent terephthalic aicd |
| Tensile strength (DIN #53455) | 652 kg./cm.$^2$ | 671 kg./cm.$^2$ | 668 kg./cm.$^2$ |
| Elongation at break (DIN #53455) | 12.2% | 10.8% | 11.1%. |
| Flexural strength (DIN #53452) | 1,120 kg./cm.$^2$ | 1,145 kg./cm.$^2$ | 1,162 kg./cm.$^2$. |
| Moisture adsorption (saturation at 20° C. and 65% relative humidity) | 7.4% | 7.4% | 7.6%. |

As illustrated in Table I, apart from the melting point, the other physical and chemical characteristics of the copolyamides made according to the present invention are only slightly dependent on the composition of the acid mixture.

Test pieces of Copolyamide A, measuring 8 cm. x 1 cm. x 0.4 cm. were also immersed in boiling water. At the end of 24 hours, they showed no visible change.

*Salt of terephthalic acid.*—166 parts of terephthalic acid were mixed with 600 parts of water. With stirring, under a stream of nitrogen, 173 parts of the diamine were added to the mixture. The resulting mixture was heated on a steam bath until complete dissolution was obtained. The solution was filtered into 1200 parts of ethyl alcohol and allowed to cool whereupon the salt separated out. The salt was obtained in a yield which was 96 percent of the theoretical value. It had a melting point of 258–260° C.

*Salt of isophthalic acid.*—166 parts of isophthalic acid were mixed with 1000 parts of methanol. With stirring, under a stream of nitrogen, 173 parts of the diamine were added to the mixture. The resulting mixture was heated on a steam bath until complete dissolution was obtained. The solution was filtered into 2000 parts of ethanol and allowed to cool whereupon the salt separated out. 310 parts of the salt were obtained which was 92.5 percent of the theoretical value. The salt had a melting point of 235–240° C.

In a stainless steel pressure vessel, 60 parts of the salt of adipic acid, 20 parts of the salt of terephthalic acid and 20 parts of the salt of isophthalic acid were dissolved in 100 parts of water at 170–180° C. By means of nitrogen pressure, the salt solution was passed through a filter into an autoclave which had been preheated to 200° C. The temperature was then raised to 240° C. At the end of 4 hours under autogenic pressure at 240° C., the water vapor was released and pressure equalization with atmospheric pressure was obtained.

The melt was then heated at atmospheric pressure at a temperature of 280° C. At the end of 6 hours at 280° C., the condensation was completed.

The melt was extruded into cold water by means of nitrogen pressure so as to form rods which were then passed to a granulator. The copolyamide had a melting point of 240–245° C.

The granules were injection molded to form shaped articles. These articles were immersed in boiling water for two weeks. At the end of this period, they showed no visible change.

*Example IV*

91.5 parts of adipic acid dichloride and 101.5 parts of isophthalyl chloride were dissolved in 6 liters of carbon tetrachloride with stirring in an enamelled mixer having a capacity of 30 liters.

170 parts of 3-aminomethyl-3,5,5-trimethylcyclohexylamine and 117.6 parts of potassium hydroxide were dissolved in 6 liters of water. The solution was immediately added to the mixer with vigorous stirring. A white powdery polyamide precipitated. After 3 minutes, the stirring was stopped and the copolyamide was separated from the solvent by centrifugation. By washing the copolyamide twice with water in the mixer, it was obtained free of chlorine. The yield was 80–90 percent of the theoretical value.

The copolyamide had an intrinsic viscosity (measured in concentrated sulfuric acid at 20° C.) of 0.83, and a melting range of 220–235° C. It was converted into an endless rod on an extruder and then granulated. The resulting glass clear granules were formed into test rods. These rods were immersed in boiling water for several days. At the end of this period, the rods showed no visible change.

I claim:

1. A linear copolyamide of 3-aminomethyl-3,5,5-trimethylcyclohexylamine and a substantially equimolar amount of an acid mixture consisting of adipic acid and an aromatic dicarboxylic acid selected from the group consisting of terephthalic acid, isophthalic acid and mixtures thereof.

2. The copolyamide of claim 1 wherein the acid mixture is comprised of 20 to 80 mol percent of adipic acid and 80 to 20 mol percent of the dicarboxylic acid.

References Cited by the Examiner

UNITED STATES PATENTS

| | | | |
|---|---|---|---|
| 2,130,523 | 9/1938 | Carothers | 260—78 |
| 2,327,131 | 8/1943 | Salzberg | 260—78 |

WILLIAM H. SHORT, *Primary Examiner.*

H. D. ANDERSON, *Assistant Examiner.*